United States Patent Office.

MAX MOELLER AND CARL OELSCHLAEGEL, OF BERLIN, GERMANY, ASSIGNORS TO THE ACTIEN-GESELLSCHAFT FÜR ANILIN FABRIKATION, OF SAME PLACE.

BLACK AZO DYE.

SPECIFICATION forming part of Letters Patent No. 543,748, dated July 30, 1895.

Application filed March 23, 1895. Serial No. 542,981. (Specimens.)

*To all whom it may concern:*

Be it known that we, MAX MOELLER and CARL OELSCHLAEGEL, of Berlin, in the Kingdom of Prussia, German Empire, have invented new and useful Improvements in the Manufacture of Black Azo Dye; and we do hereby declare that the following is a full, clear, and exact description of the invention, which will enable others skilled in the art to which it appertains to make and use the same.

The combination of $alpha_1$ $alpha_4$ amidonaphthol-$alpha_2$ monosulfonic acid with two molecules of diazo bodies is the subject of several Letters Patent. Compare English Patent No. 7,713 of 1891 and French Patent No. 213,232.

We have now discovered that under certain conditions the $alpha_1$ $alpha_4$ amidonaphthol-$alpha_2$ monosulfonic acid is able to combine with three molecular proportions of diazo compounds.

The main point for the production of such dyes is that the combination with the third diazo body is effected in weak-acid solution, and in order to obtain a good result it is also of great advantage to combine the second diazo compound equally in acid solution.

The following example will serve to illustrate the manner in which our invention can be carried into practical effect:

Fifteen kilos of alpha-naphthylamin are diazotized in the usual way and the solution of diazonaphthalen obtained is allowed to run into an ice-cold alkaline solution of twenty-four kilos of $alpha_1$ $alpha_4$ amidonaphthol-$alpha_2$ monosulfonic acid. After the combination is completed the whole is acidulated with acetic acid and combined again with the same quantity of alpha-diazonaphthalen. As soon as the diazo compound has disappeared a solution of para-diazobenzolsulfonic acid, obtained from 19.5 kilos of sulfanilic acid, is added, care being taken that the solution always contains an excess of acetic acid. After two or three days the combination is completed by heating and the coloring-matter is precipitated by means of salt, filtered and dried. The combination with the first diazo compound can also be effected in acid solution. The black dye obtained shows the same general properties, but dyes wool only a more greenish-black tint. In the latter case we also may combine the para-diazobenzenesulfonic acid, in the second place obtaining, substantially as described, the same result.

The dye in the dry state is a brown-black powder with slight metallic luster, which is readily soluble in water, and practically insoluble in alcohol. It dissolves in concentrated sulfuric acid with grayish-blue color. On diluting with water the free color acid is precipitated from this solution in the form of dark flakes.

Having now described our invention, what we claim is—

The black dye derived from $alpha_1$-$alpha_4$-amidonaphthol-$alpha_2$-monosulfonic acid by reacting upon this acid with two molecules of alpha-diazonaphthalen and one molecule of para-diazobenzenesulfonic acid substantially as herein set forth; said dye forming a brownish-black powder with slight metallic luster, readily soluble in water practically insoluble in alcohol, dissolving in concentrated sulfuric acid with grayish-blue color, from which solution on diluting with water the free color acid is precipitated in the shape of dark flakes.

In testimony whereof we hereunto set our hands and affix our seals, in the presence of two witnesses, this 9th day of March, A. D. 1895.

MAX MOELLER. [L. S.]
CARL OELSCHLAEGEL. [L. S.]

Witnesses:
OSCAR WEBER,
GUSTAV LUCHT.